S. M. SWARTZ.
Corn Planter.
No. 57,994. Patented Sept. 11, 1866.
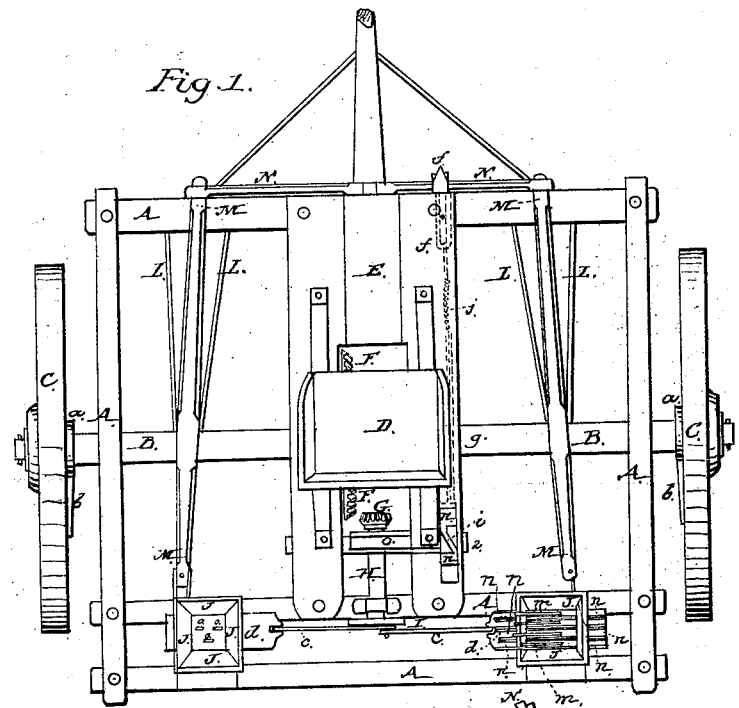
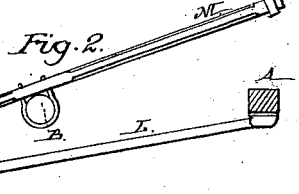
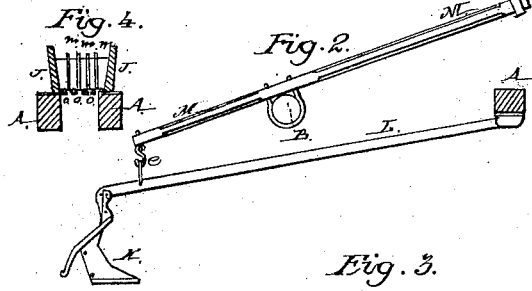
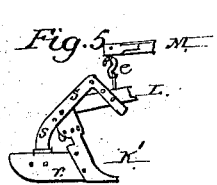
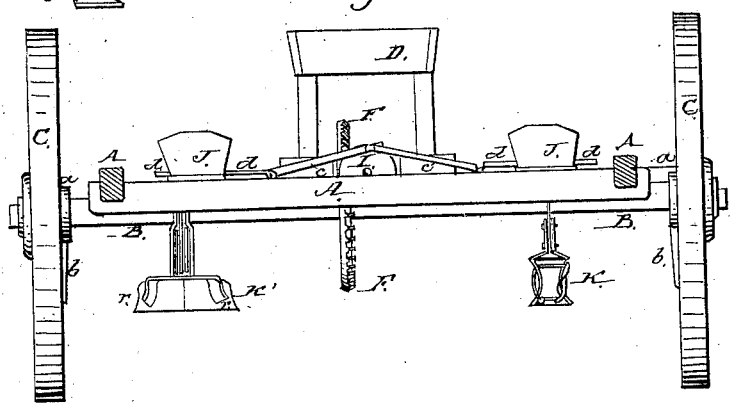
Witnesses: Inventor:

UNITED STATES PATENT OFFICE.

SAMUEL M. SWARTZ, OF MILLHEIM, PENNSYLVANIA.

CORN-PLANTER AND PLOW COMBINED.

Specification forming part of Letters Patent No. 57,994, dated September 11, 1866.

*To all whom it may concern:*

Be it known that I, SAMUEL M. SWARTZ, of Millheim, in the county of Centre and State of Pennsylvania, have invented certain new and useful Improvements in Corn-Planters and Plows; and I do hereby declare the following to be a full, clear, and exact description of the construction and operation of the same, reference being had to the accompanying drawings, making a part of this specification, in which—

Figure 1 represents a top plan of the machine. Fig. 2 represents a sectional side view of a portion of the machine. Fig. 3 represents a rear elevation. Fig. 4 represents a section through one of the seed-boxes; and Fig. 5 represents one of the plows.

Similar letters of reference where they occur in the several figures denote like parts of the machine in all cases.

My invention relates to a machine for planting corn, and which may afterward be used as a plow for plowing the corn after it is ready to be worked.

To enable others skilled in the art to make and use my invention, I will proceed to describe the same with reference to the drawings.

A represents a rectangular frame placed upon an axle, B, which is in turn supported in two carrying and driving wheels, C C, that have a ratchet-and-pawl connection, a b, with said axle, so that they shall turn together as the machine is drawn forward, but be independent of each other when the machine is backed or turned around. D is the driver's or operator's seat, and E the platform for the support of his feet.

At about the center of the axle B there is a bevel-wheel, F, that turns with the axle, and this bevel-wheel, when the machine is planting, gears with a bevel-pinion, G, on a crank-shaft, H, that carries on its extreme rear end a crank-wheel, I, to a wrist-pin on which the pitmen c c are connected, the other ends of said pitmen being attached to the seed-slides d d, arranged in the bottoms of the seed-boxes J J at or near each side of the frame.

The plows K K' for opening up the furrows for the corn to be planted are hung to the ends of beams L, that are hinged to the front portion of the frame, and extend rearward to a point under, or nearly under, the seed boxes or hoppers. To the axle B are pivoted two lever-arms, M M, connected at their front ends by a cross-bar, N, and their rear ends are attached to the plow-beams L by links e, so that by means of these levers M M the plows may be raised and lowered at pleasure, and held up when the machine is not planting or plowing.

At the front of the main frame there is a spring clasp or catch, f, which will hold the cross-bar N and the levers M M down at their front, and consequently the plows up at their rear. This clasp f is connected by a rod, g, (dotted lines in Fig. 1,) to a shipper, h, of a Z form, the waist i of which shipper works between two studs or pins, 2 2, in a bearing-piece, O, in which the forward end of the shaft H rests and is supported; and connected with this rod g there is a coiled spring, j, (or any other well-known spring that will answer the purpose,) for moving the shipper, as will be explained.

When the machine is to be thrown out of working condition the cross-bar or rung N is brought down to the frame, which raises the plows up above the ground. The spring-clasp f is now drawn forward, which also draws forward the shipper h, and the obliquity of the waist i (the shipper itself moving in a right line) moves, by means of the pins or studs 2 2, the bearing-piece O, and the bevel-gear G, and throws it out of mesh with the gear F. When the spring-clasp is let go its hasp takes over the rung N and holds it firmly. In drawing forward the clasp f the spring j is compressed. When the machine is to be put in working condition the clasp is moved forward, and the rung is raised, and the plows drop to the ground, and when the clasp is let go the recoil or reaction of the spring j moves the shipper and puts the pinion G in gear with the wheel F, and all is ready for planting.

I place ribs n n, &c., on top of the seed-slides d, and make the openings o, through which the grains drop, between said ribs, and of such size as to admit the grains to drop through edgewise only. m m are spring-fingers projecting into the seed-hoppers, and their ends working between the ribs n n for stirring and turning the grains and compelling them to stand edgewise between the ribs.

By changing the seed-holes $o$, or the wrist-pin, or crank-wheel, or pitmen, I can drop as close together or as far apart as may be desired, and as many grains at a time as the user may prefer.

When planting corn the plow for opening the furrow is like that at K; and when the growing corn is to be plowed I put on extra wings $r$, as at K', and an extra brace, as at $s$.

Having thus fully described my invention, what I claim, and desire to secure by Letters Patent, is—

1. The arrangement of the levers M and their rung N with the plows, and with the clasp $f$ and shipper $h$, so that when the plows are raised up the driving mechanism will be thrown out of gear, and when let down will put itself into gear, substantially as described.

2. The ribs $n$ and openings $o$ on and through the seed-slides, so that the grains can stand edgewise between the ribs and drop edgewise through the holes, as described.

3. In connection with the ribbed seed-slides, the spring-fingers $m$, for arranging the grains between the ribs.

SAMUEL M. SWARTZ.

Witnesses:
 A. B. STOUGHTON,
 EDW. F. BROWN.